United States Patent [19]

Rice

[11] Patent Number: 4,789,403

[45] Date of Patent: Dec. 6, 1988

[54] SURFACE MODIFIED LAYERED LATTICE SILICATE PIGMENTS

[75] Inventor: Camilla A. Rice, Sandersville, Ga.

[73] Assignee: E.C.C. America Inc., Atlanta, Ga.

[21] Appl. No.: 943,669

[22] Filed: Dec. 17, 1986

Related U.S. Application Data

[63] Continuation-in-part of Ser. No. 887,320, Jul. 22, 1986, abandoned.

[51] Int. Cl.$^4$ .......................... C09C 3/08; C09C 1/28; C04B 14/04
[52] U.S. Cl. ............................ 106/417; 106/308 M; 106/308 N; 106/309; 106/469; 524/445; 524/449; 524/447; 106/468; 106/487
[58] Field of Search ............... 428/407; 427/213, 221; 523/205, 209; 524/789; 106/308 N, 308 Q, 308 M, 309

[56] References Cited

U.S. PATENT DOCUMENTS

| | | | |
|---|---|---|---|
| 3,227,675 | 1/1966 | Papalos | 260/41 |
| 3,290,165 | 12/1966 | Iannicelli | 106/308 |
| 3,377,189 | 4/1968 | Acker | 427/221 |
| 3,386,851 | 6/1968 | Harlan | 427/221 |
| 3,397,171 | 8/1968 | Iler . | |
| 3,567,680 | 3/1971 | Iannicelli | 260/41.5 |
| 3,573,944 | 4/1971 | Gebura | 106/288 |
| 3,661,620 | 5/1972 | Dekking et al. | 523/205 |
| 3,773,708 | 11/1973 | Takahashi et al. | 523/209 |
| 3,901,845 | 8/1975 | Newbould | 106/308 N |
| 3,912,532 | 10/1975 | Simone . | |
| 3,967,006 | 6/1976 | Yamaguchi et al. | 427/221 |
| 4,091,164 | 5/1978 | Schwarz | 428/404 |
| 4,230,501 | 10/1980 | Howard et al. | 106/308 Q |
| 4,349,389 | 9/1982 | Schofield | 106/308 Q |
| 4,433,097 | 2/1984 | Tawada et al. | 523/209 |
| 4,472,538 | 9/1984 | Kamigaito et al. | 523/209 |
| 4,525,388 | 6/1985 | Rehder et al. | 427/221 |

Primary Examiner—Lewis T. Jacobs
Attorney, Agent, or Firm—Stefan J. Klauber

[57] ABSTRACT

A method of producing a layered lattice silicate which is surface modified with an organic material wherein said silicate in substantially dry, particulate form is contacted with an organic monomer, co-monomers or a prepolymer, and surface polymerization or reaction in situ on the silicate in the presence of a gaseous hydrogen atmosphere is effected.

7 Claims, 8 Drawing Sheets

SURFACE MODIFIED LAYERED LATTICE SILICATE PIGMENTS

RELATED APPLICATION

This application is a continuation-in-part U.S. Ser. No. 887,320 filed on July 22, 1986, now abandoned.

FIELD OF THE INVENTION

This invention relates generally to siliceous minerals such as aluminosilicates and the like, and more specifically relates to a method for producing a layered lattice silicate which is surface modified with an organic material. The products comprise particles of the layered lattice silicate, the surfaces of which are modified by a polymer.

BACKGROUND OF THE INVENTION

The layered silicates to which the invention is applicable are of the type which can be represented by the general formula $E_iM_xSi_yO_n(OH)_m$ where M is Al, Mg, or Fe, x =2 to 6; y =2 to 8, n =2 to 20, m =0 to 8, and $E_i$ is one or more exchangeable ions (K, Na, Mg, Ca, Ba, Fe, Li, etc.). These layered silicates will hereinafter in this specification be referred to as "layered lattice silicates".

In the instance of layered lattice silicates such as kaolin clays, it has long been recognized that products having new properties and uses could be formulated by combining these aluminosilicates with organic materials. However, useful progress in this direction has tended to be limited by the lack of available covalent bonding at the mineral/organic interface. In the past this difficulty has been partially overcome by surface modification of the kaolinite through coupling with organosilane compounds, and subsequent reaction between dependent silanes and organics.

Thus, in Papalos, U.S. Pat. No. 3,227,675, for example, kaolin clays are described, the surfaces of which are modified with organofunctional silanes. A typical such agent, e.g., is a methacryloxypropyltrimethoxy silane. The kaolin clays so modified are advantageously used as fillers for natural and synthetic rubbers and the like. It is also pointed out in this patent that such modified products can serve as intermediates for synthesis of new pigments, which are useful as fillers for polymers, elastomers and resins. This result obtains because the silanes used to modify the kaolin clays are di- or polyfunctional, and only one functional group, the silane, is attached to the clay, leaving the remaining reactive groups to react further.

Additional references of this type include Iannicelli U.S. Pat. No. 3,290,165, and Iannicelli, U.S. Pat. No. 3,567,680.

However, the modification of aluminosilicates such as kaolin clays by the use of organosilanes, is a complicated and expensive process. Among other things, the cost of the organosilane itself is very high. Furthermore, the resulting products have only limited capability for further reaction, regardless of the particular organosilanes utilized. Also, when used in perhaps the most common application, i.e. as fillers in polymer systems, the limited number of available structures tends to impose limitations on the compatibility of such organosilanemodified pigments with various polymer matrices.

U.S. Pat. No. 3,397,171 describes a process for the production of polyamide textile fibers in which a small percentage of a kaolinite is added to polycarbonamide-forming reagents plus a deflocculant and the mixture is then polymerized. It is mentioned, however, that microscopic inspection reveals that each kaolinite platelet is surrounded by an elongated void where the polymer has separated from the particle, so that evidently no bonding has occurred by use of this process.

In U.S. Pat. No. 3,912,532 particles of a clay such as kaolin are coated with a urea-formaldehyde resin by dispersing the clay particles in an aqueous solution of a prepolymer of urea-formaldehyde and then polymerizing the latter. The products are used as opacifying agents for paper.

U.S. Pat. No. 4,230,501 describes compositions of pigments such as carbon black mixed with a combination of waxy materials and wax-like materials. The products are said to be dispersible in plastics.

According to U.S. Pat. No. 4,091,164, normally hydrophilic inorganic fillers such as kaolin clays are modified to enhance their dispersibility in polymeric resins by admixing filler particles with a block copolymer of ethylene oxide and propylene oxide under shear and at elevated temperature to coat the filler particles with the block copolymer.

In U.S. Pat. No. 4,349,389 an inorganic pigment such as titanium dioxide, suitably as an aqueous slurry, is coated with a substance which renders the surface hydrophobic, such as dispersing agents of the type of alkylbenzene sulfonic acids, and then with a thermoplastic polymer which may be used as a mixture with an emulsifying agent. The products are said to be dispersible in thermoplastics and paints.

U.S. Pat. No. 3,573,944 describes a process of forming organophilic particles from a clay such as kaolin, by heating to drive off bound water, cooling, adding a solution in a petroleum ether solvent of an alkylene divinyl ether and polymerizing said ether while refluxing the solvent.

U.S. Pat. No. 3,901,845 describes filled and reinforced polyamide (e.g. nylon 6 or nylon 6,6) compositions in which a mineral filler such as silica is chemically coupled to the polymer matrix by an aromatic compound having a carboxyl group and a hydroxyl or amine group.

In accordance with the foregoing, it may be regarded as an object of the present invention, to provide new types of surface modified layered lattice silicate pigments, which are totally and directly compatible with the polymer systems to which they may be added as fillers, and which when so used provide outstanding improvements in the mechanical and other useful properties of the filled system.

It is also an object of the invention to provide a method of surface modification of layered lattice silicates in which improved bonding of modifier to the silicate surface is achieved.

It is a further object of the invention to provide a relatively simple, and effective process, for preparing the aforementioned surface modified pigments from layered lattice silicates, such as aluminosilicates, and which enables preparation of such products with a wide variety of compatibility characteristics for use in desired polymer matrices.

SUMMARY OF THE INVENTION

Now in accordance with the present invention, the foregoing objects, and others as will become apparent in the course of the ensuing specification, are achieved in a method of treating a layered lattice silicate so that the latter becomes surface modified with an organic material. According to the invention, the layered lattice silicate which is in substantially dry particulate form, is contacted with an organic monomer, co-monomers, or a prepolymer, viz., not fully polymerized to its highest molecular weight range, and surface polymerization or reaction is effected in the presence of a gaseous hydrogen atmosphere. The level of addition of the monomers/prepolymers may suitably be in the range of about 0.25 weight percent to about 10 weight percent based on the weight of the silicate. The starting material, i.e. the layered lattice silicate such as a refined kaolin, is initially thoroughly dried and blended with a solid or liquid monomer (or, as mentioned, co-monomers or a prepolymer), as for example, by milling of the dry kaolin and a dry monomer in a suitable mill, which may also be screened. The resulting powder is thereupon provided in a suitable reactor, which has previously been heated to an intermediate temperature, for example, 100° C. The reactor is flushed with nitrogen to remove residual oxygen and thereupon a flow of hydrogen is substituted for the nitrogen. The hydrogen need not be pure and may contain inert constituents. Heat is then provided to increase the temperature to at least the melting point of the monomer, but insufficient to volatilize the monomer, while the hydrogen atmosphere is maintained. The temperatures are generally under about 350° C., typically being of the order of 150° to 250° C. for representative monomers, or somewhat lower.

The said reaction may be conducted in apparatus which provides good gas-solids contact, such as a rotary furnace. The said reaction may also be conducted in a fluidized bed reactor, with the gaseous components passing upwardly through a suitable diffuser plate, and into a fluidized bed of the particulate material being treated. Typical reaction times are from about 5 to 45 minutes, depending upon concentration and composition of the reactants and temperature, although longer reaction times can be utilized.

If a fluidized bed is used, after the reaction is completed, for example, in 25 minutes, the heating source is removed from the reactor and the unit allowed to cool to about 100° C. while the hydrogen atmosphere is maintained, and thereafter the hydrogen is replaced by a flow of nitrogen, upon which the reactor is allowed to cool down and the product removed.

The product of the invention is found to be a layered lattice silicate such as kaolin, which is surface bound to the polymerized organic. When the product is used in typical filler applications, it yields excellent improvements in the mechanical and other useful properties of the filled system.

Thus, it has now been found that with the use of hydrogen an effective, strong bonding of modifier to the silicate surface is achieved.

Various layered lattice silicates, including minerals comprising same, may be treated by the method of the invention. Thus, for example, clays of the halloysite, illite, kaolinite, montmorillonite, palygorskite groups, and various other clays, can be readily treated by the present invention.

A large variety of organic monomers can be used in the process of the invention; for example E-caprolactam or alternatively 6-amino caproic acid, to produce nylon 6; hexamethylenediammonium adipate or the co-monomers hexamethylene diamine and adipic acid, to form nylon 6,6; the corresponding monomer from hexamethylene diamine and sebacic acid or the co-monomers, to form nylon 6,10; and the lactam of heptanoic acid to form nylon 7. It will be apparent that other monomers, co-monomers or prepolymers may be used to produce various nylon types. In addition, other types of prepolymers (e.g. ABS prepolymer, polybutadiene, polypropylene, polyethylene) are capable of being reacted in situ on the mineral, to make the latter useful as fillers for polymer matrices, in particular matrices of the same polymer as that deposited on the layered lattice silicate particles. Similarly, the in situ formed polymer need not be identical to the matrix polymer, provided that the two are compatible. It is believed that the polyamide (nylon) type polymers grow from the surface of the mineral which results from the exposure of the mineral surface to nylon type monomers/prepolymers; and that in the case of the other resins (ABS prepolymer, polybutadiene, polypropylene, polyethylene) the polymer resin is exposed to the mineral surface and becomes bonded to it.

Thus, the invention includes the in situ synthesis of polymers on a layered lattice silicate surface with the primary, i.e. first layers being surface bonded; and as a product, a particulate layered lattice silicate comprising particles of the silicate the surfaces of which are modified by the in situ synthesized polymer.

DETAILED DESCRIPTION

The invention will now be illustrated by the Examples, which, however, are to be considered as merely exemplary of practice of the invention, and not as delimitive thereof.

In connection with the Examples, certain compounds with their formulas, which are interrelated, are shown below:

adipic acid 

-continued 6-amino caproic acid 

E-caprolactam 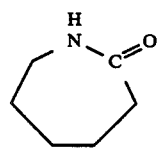

nylon 6 
nylon 6,6

EXAMPLE 1

This Example illustrates the procedure involved in preparation of a typical surface-modified filler pigment pursuant to the invention.

The starting material for this Example was a commercially available calcined kaolin, viz., the calcined kaolin product Alphatex ® of Anglo-American Clays Corporation (Sandersville, Ga.), which product is further described in U.S. Pat. No. 4,386,948. This material, in thoroughly dry form, was blended with a solid monomer. In this instance, the monomer was 6-amino caproic acid ("6 ACA"), which was milled with the dry kaolin in a Micropulverizer ® mill and screened during milling. The screen had a mesh opening of 0.0067 inches. The 6 ACA was mixed during milling at 2.5% by weight of the kaolin. After the material was thoroughly milled and screened, it appeared as a uniform powder. A pound of the said powder was placed in a fluidized bed reactor that had previously been heated to a temperature of approximately 100° C. The reactor was flushed with nitrogen to remove residual oxygen. Thereupon, a flow of hydrogen was introduced by switching the flow of nitrogen to hydrogen. The temperature was then increased to approximately 250° to 265° C. This temperature was maintained for approximately 25 minutes while the hydrogen atmosphere was maintained; and thereafter the hydrogen was replaced by a flow of nitrogen, after which the unit was allowed to cool down and the product removed for testing.

Figure 1:
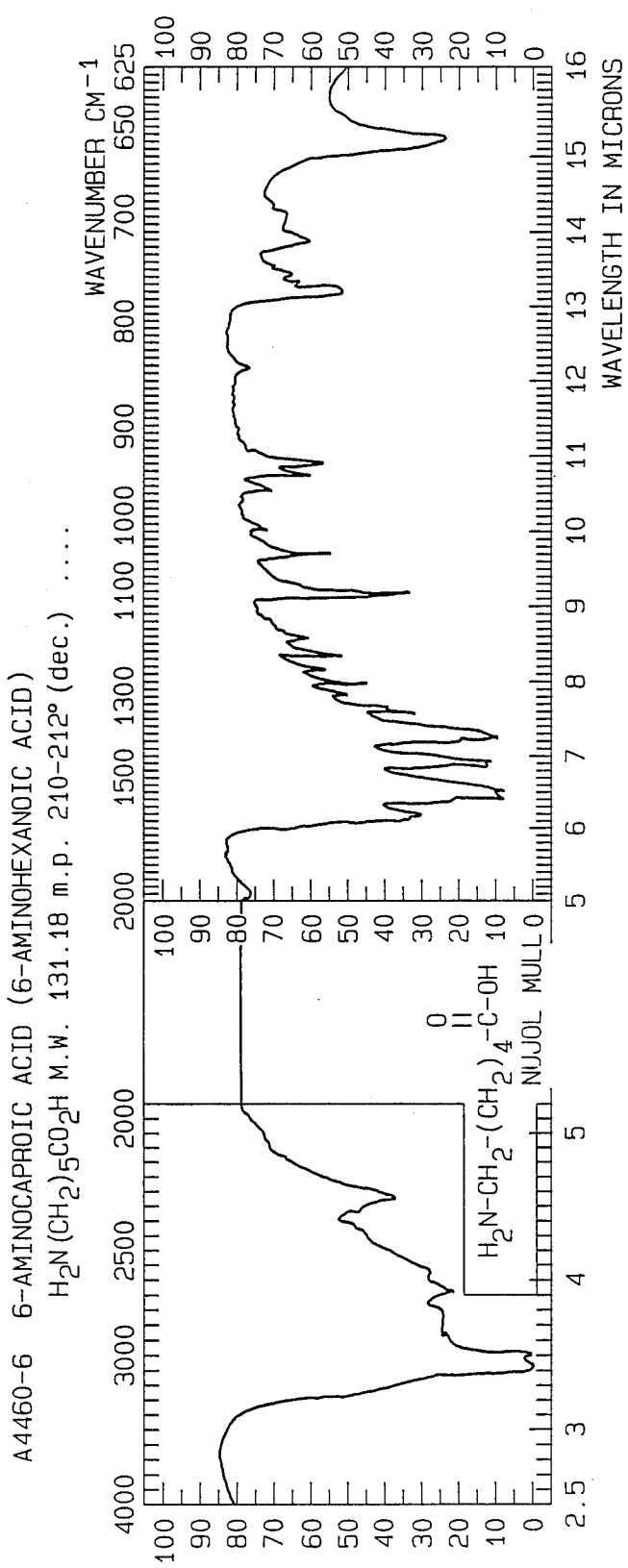
FIG. 1 is a reference infrared spectra known in the literature (taken from the Aldrich Library of Infrared Spectra) of 6-aminocaproic acid.
Figure 2:
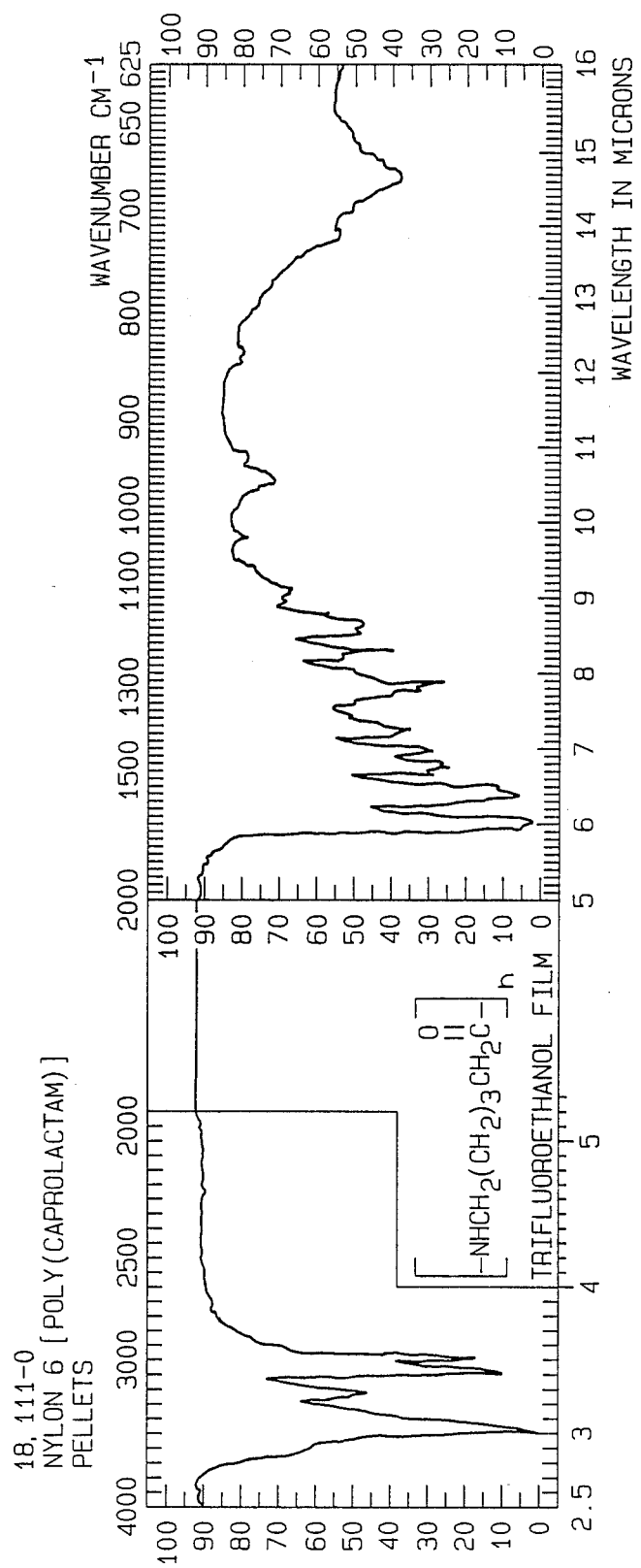
FIG. 2 is a reference infrared spectra from the cited Aldrich Library, for nylon 6 [poly(caprolactam] pellets.
Figure 3:
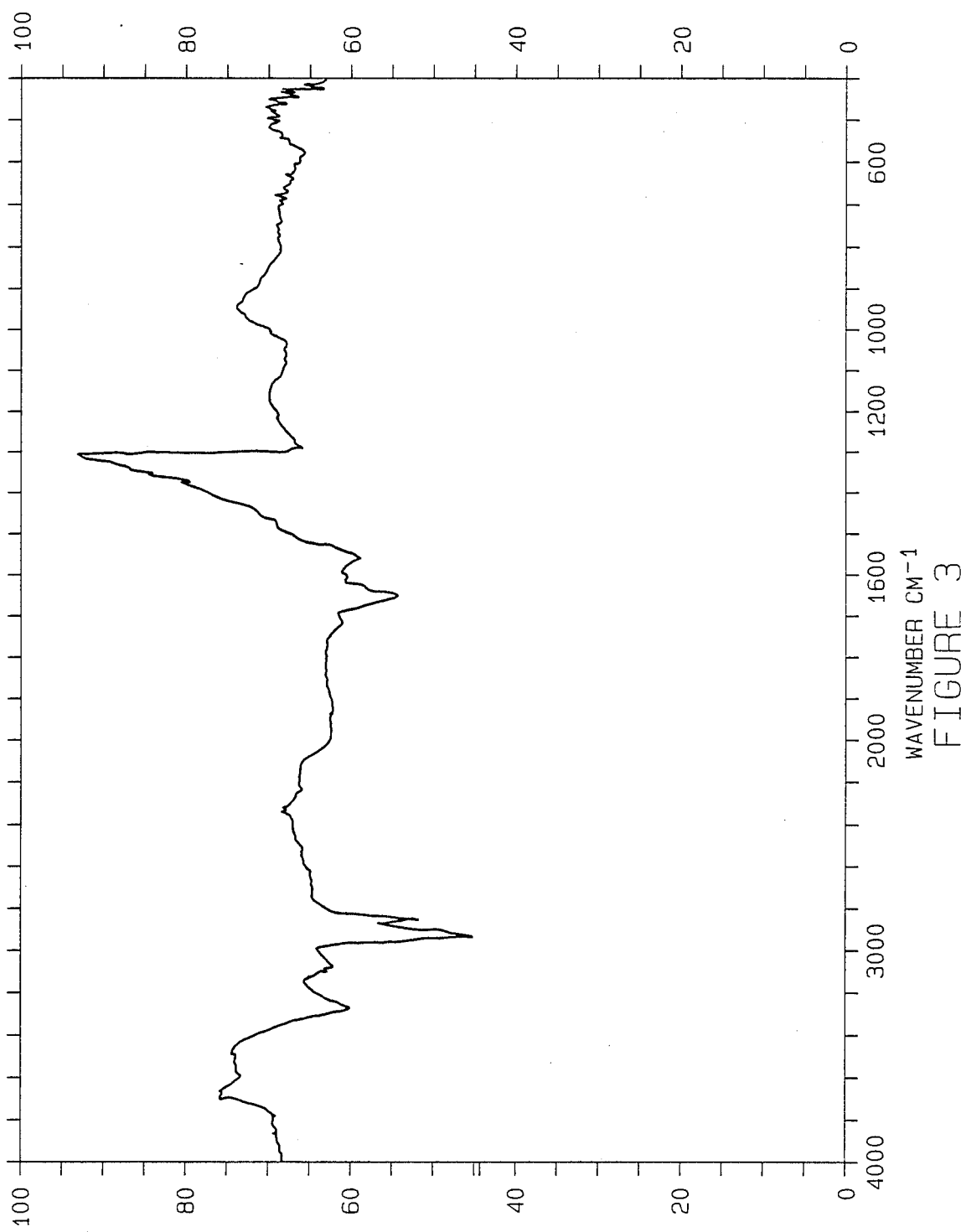
FIG. 3 is an infrared drift spectra for a sample of a calcined kaolin reacted in accordance with the invention with 2.5% by weight of 6-aminocaproic acid.

Drift infrared spectra were obtained on a Perkin-Elmer 1710 F.T. infrared spectrophotometer fitted with a diffuse reflectance attachment, and are set forth in FIG. 3. The base kaolin has been subtracted from this spectra to enable one to monitor the surface organic treatment without interference of the base kaolin. (Comparison should be made to the reference spectra of FIGS. 1 and 2). IR bands in the spectra showed the following: A shift can be noted in the 1575 $cm^{-1}$ band which is shifted approximately 50 $cm^{-1}$ toward a higher wave number, and in addition there is a broadening observed in the 1640 $cm^{-1}$ band; and further seen is a disappearance of the 3300–3400 $cm^{-1}$ band due to the NH stretch. This all indicates that the molecule of the 6 ACA has bonded to the surface of the kaolin. Also to be noted is that small bands are appearing at 3300 and 3080 $cm^{-1}$, which are indicative of polymerization and nylon formation.

EXAMPLE 2

Figure 4:
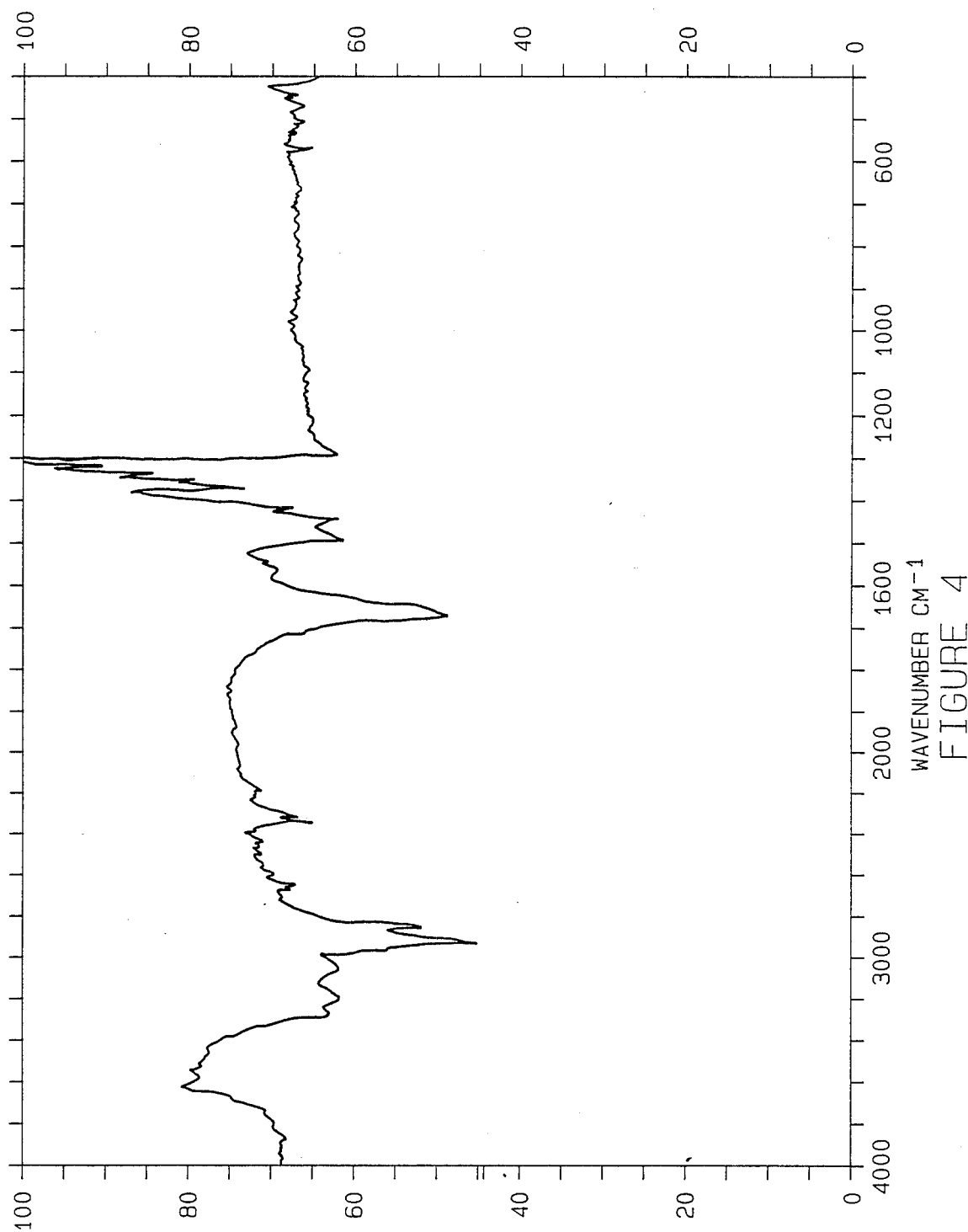
FIG. 4 is an infrared drift spectra for a sample of a calcined kaolin reacted in accordance with the invention with a 1% water and 5% caprolactam composition.

The procedure utilized in this example was substantially identical to that used in Example 1, except that the starting material for the treatment by the process of the invention was a further commercially available calcined kaolin, the Whitetex ® product of Freeport Kaolin, which is a so-called "PRP" (paper, rubber, plastic) grade of calcined kaolin, i.e. a somewhat coarser kaolin having an average particle size of approximately 70% by weight less than 2 microns equivalent spherical diameter (E.S.D.). Further, in this Example, the treating composition was 1% water and 5% caprolactam. Following the preparation of the monomer/kaolin mixture by the procedure as in Example 1, the treatment in the reactor was identical as described in Example 1, except that a temperature of 190° C. was used; and after such treatment, infrared drift spectra were obtained for the sample and are set forth in FIG. 4. The spectra in FIG. 4 should be compared with those in FIG. 2, which is a reference infrared spectra for nylon 6. It will be evident by such comparison that the polymerized nylon 6 has been achieved at the surface of the kaolin.

EXAMPLE 3

Figure 5:
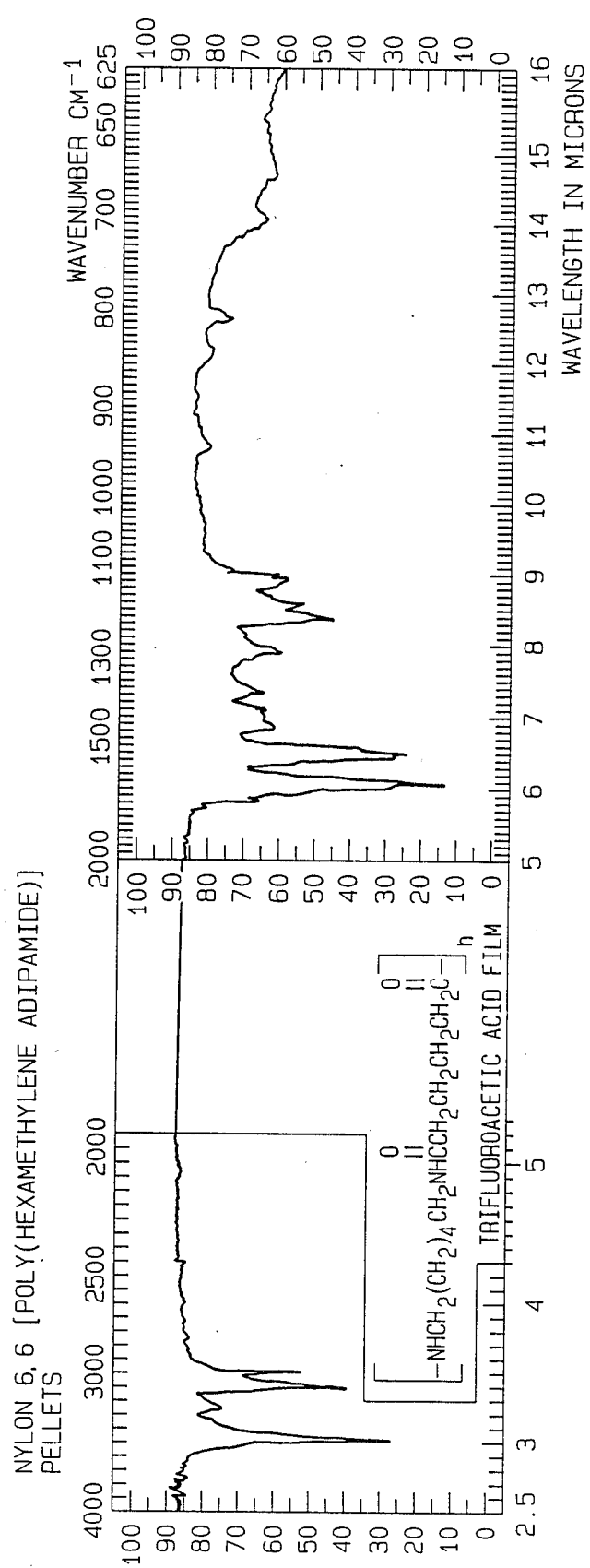
FIG. 5 is a reference infrared spectra from the above cited Aldrich Library, for nylon 6,6 [poly(hexamethylene adipamide)]pellets.
Figure 6:
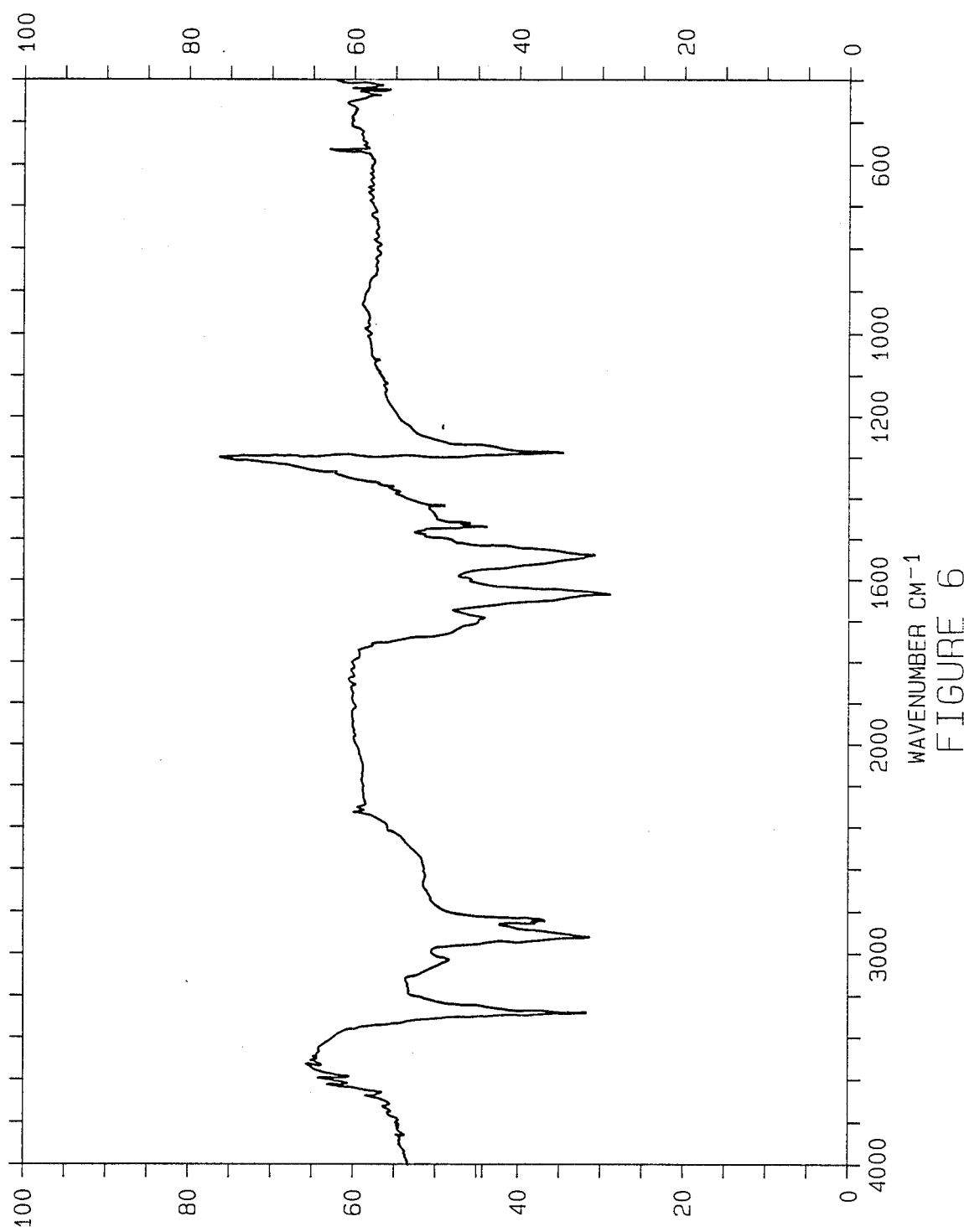
FIG. 6 is an infrared drift spectra for a sample of a calcined kaolin reacted in accordance with the invention, with 3% by weight adipic acid plus 2.6% 1,6 diaminohexane.

The procedure utilized in this Example was substantially identical to that set forth in Example 2, and the starting material was the Whitetex ® calcined product aforementioned. However, the monomer in this instance comprised 3.0% adipic acid together with 2.6% by weight of 1,6 diaminohexane. Following the treatment as set forth in Examples 1 and 2, (but utilizing a reaction temperature of approximately 280° C.), the drift spectra were obtained for the product and were compared to those of nylon 6,6 which appear in FIG. 5. The drift spectra of the samples are seen in FIG. 6, and it will be evident again that polymerization upon the surface of the calcined kaolin has occurred to produce nylon 6,6.

EXAMPLE 4

Figure 7:
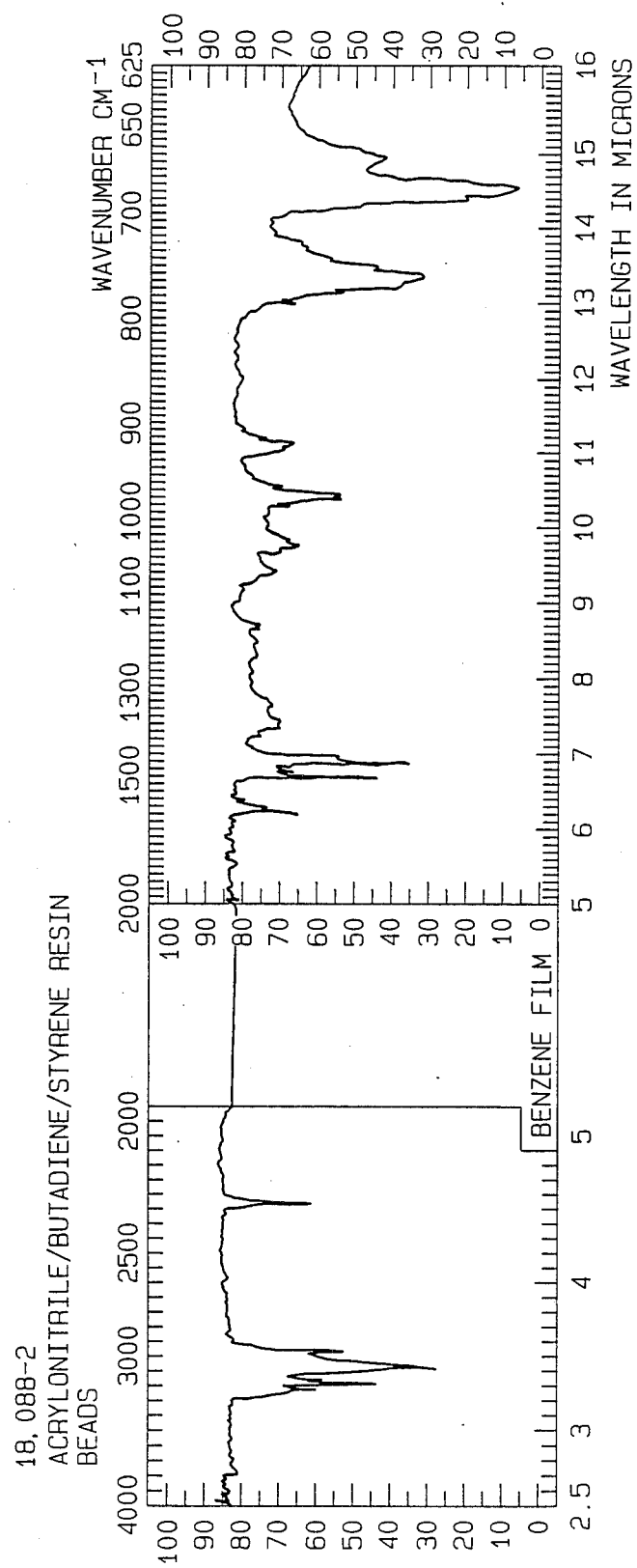
FIG. 7 is a reference infrared spectra from the above cited Aldrich Library, for Acrylonitrile/butadiene/styrene (ABS) resin beads.
Figure 8:
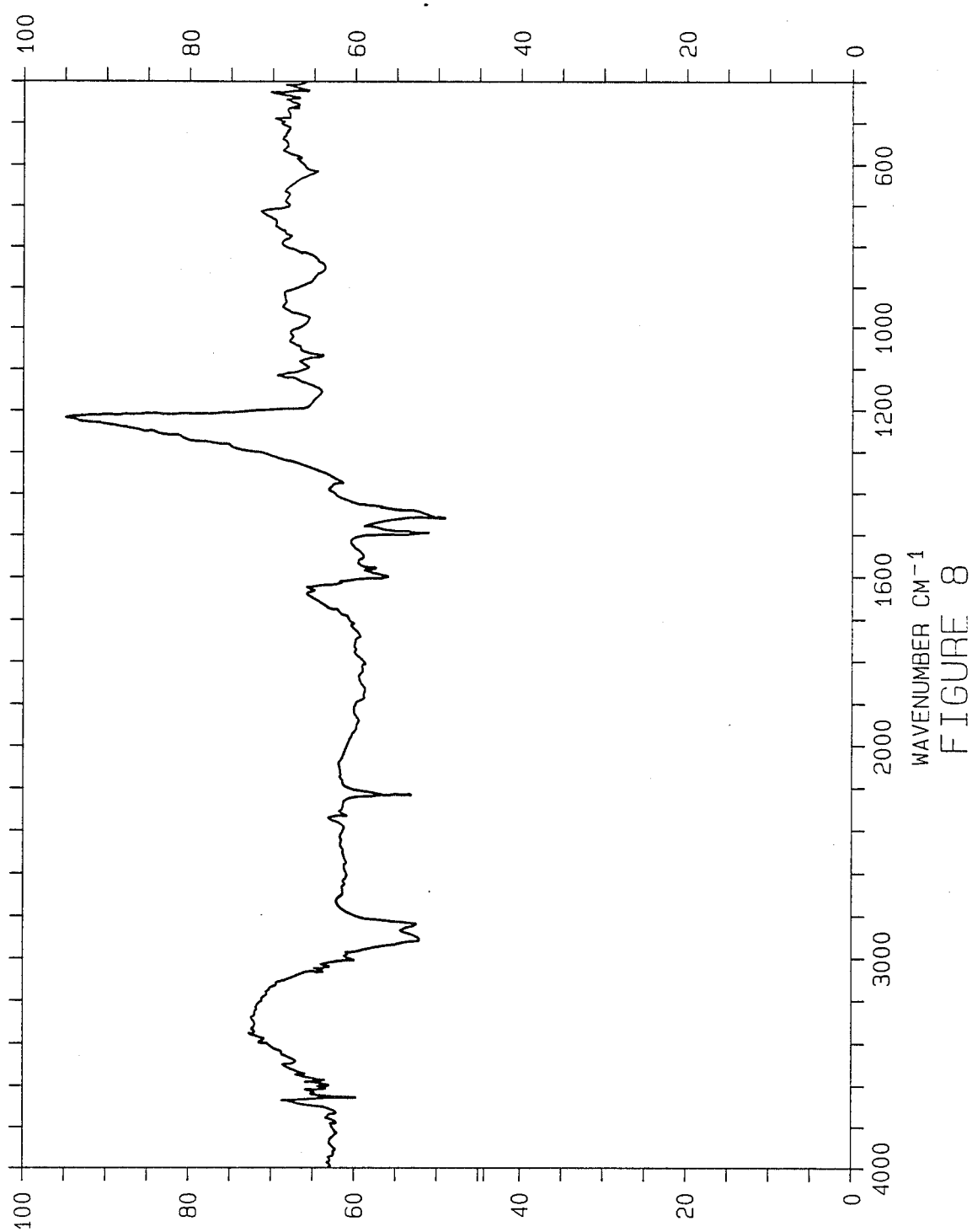
FIG. 8 is an infrared drift spectra for a sample of an air classified kaolin reacted in accordance with the invention with 5% by weight of an ABS prepolymer.

In this Example, a further kaolin was utilized, namely an uncalcined or, as it is sometimes referred to in the art, a "hydrous" kaolin, the material being an air-classified product having a particle size distribution such that 82% by weight of the particles were of less than 2 micrometers E.S.D.; and having a surface area of 20 $m^2/g$. The monomer in this instance comprised 5% by weight of an ABS prepolymer. This was the resin of high butadiene content product of Aldrich (#18,088-2). The procedure used during treatment was as described in connection with the prior Examples (except reaction temperature was 275° C.); and following such preparation, the resultant surface-modified samples were subjected to analysis to provide the infrared drift spectra as aforementioned. The resulting spectra are set forth in FIG. 8, which may be compared with FIG. 7, wherein a reference infrared spectra appears for ABS resin beads.

EXAMPLE 5

In this Example, three further types of starting materials were utilized and subjected to the process of the invention. Specifically utilized were a Silver Bow ® talc obtained from Pentech; a white bentonite, i.e. the Bentolite ® L product of Southern Clay Products Company of Gonzales, Tex.; and a mica, which was separated from micaceous clays including over 35% mica. The said mica was of the muscovite species, i.e. it was dioctahedral in form. The procedures used were otherwise those of Example 1, i.e. the monomer was 6-aminocaproic acid utilized at 2.5% by weight addition level. In each instance, following treatment, the resulting treated samples were tested by obtaining infrared drift spectra, and it was found that surface polymerization upon each of the samples had occurred as described in connection with the prior Examples. Samples were obtained using as initial starting materials both uncalcined dry particulates, and calcined particulates; and in each instance the resultant final products displayed similar surface polymerization.

EXAMPLE 6

The surface-modified products of the present invention are particularly useful as fillers in plastic, rubber and resin systems and the like, wherein by virtue of their unique compatibility enabled with such systems, excellent mechanical, thermal and other properties are enabled in the thereby filled systems. Accordingly, and in other to demonstrate this facet of the invention, a series of products prepared by the procedures described in the foregoing Examples were evaluated in a filled system. In these instances the prepared products were used as a 40% by weight filler in a nylon system, namely in Vydyne 21X, which is a nylon 6,6. This product is available from Monsanto and is normally commercially filled with a mineral filler at the 40% level.

Melt mixing with nylon resins can conveniently be achieved by methods of extrusion (single or twin-screw) injection molding, milling and the like.

The mixing with the nylon was by processing in a twin screw extruder, followed by injection molding. The procedures in injection molding were standard with respect to the nylon molding procedures. The resultant materials were tested with respect to tensile strength, modulus, and heat deflection at 264 psi, as shown in Table I below.

TABLE I

| Sample No. | Sample Composition | Tensile Strength (psi) | Tensile Modulus $\times 10^5$ psi | HDT* at 264 psi |
|---|---|---|---|---|
| 1 | kaolin treated with 1 wt % 6 ACA | 6263 | 6.3 | 158° C. |
| 2 | untreated hydrous kaolin (control) | 3186 | 5.5 | 142° C. |
| 3 | hydrous kaolin & 1% caprolactam | 7680 | 6.0 | 153° C. |
| 4 | hydrous kaolin | 7072 | 5.8 | 151° C. |

TABLE I-continued

| Sample No. | Sample Composition | Tensile Strength (psi) | Tensile Modulus $\times 10^5$ psi | HDT* at 264 psi |
|---|---|---|---|---|
|  | & 1% amino silane |  |  |  |
| 5 | calcined kaolin & 1% amino silane | 9027 | 5.3 | 163° C. |
| 6 | calcined kaolin & 1% 6ACA | 8906 | 5.7 | 157° C. |
| 7 | commercially filled calcined kaolin** | 9210 | 5.7 | 140° C. |

*This test is carried out by maintaining the sample at 264 psi, and then determining the temperature at that pressure at which it deforms.
**R250 - Monsanto 40% mineral filled Vydyne with impact modifier. Samples 1–6 are devoid of any impact modifiers.

Thus, when the products of this invention are used as a filler in nylon or in other filled systems, there are found increased modulus, an increase in heat deflection temperature, an increase in amodulus stiffness, and increase in tensile strength.

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

I claim:

1. A method of producing a layered lattice silicate which is surface modified with an organic material, wherein the silicate in substantially dry, particulate form is contacted with an organic monomer, co-monomers, or a prepolymer, in the presence of gaseous hydrogen.

2. A method in accordance with claim 1, in which said layered lattice silicate is a kaolin.

3. A method in accordance with claim 1, in which said layered lattice silicate is a mica.

4. A method in accordance with claim 1, in which said layered lattice silicate is a talc.

5. A method in accordance with claim 1, in which said layered lattice silicate is a bentonite.

6. A method in accordance with claim 1, in which a prepolymer of acrylonitrile/butadiene/styrene is used.

7. A method in accordance with claim 1 in which a monomer selected from the group consisting of 6-amino caproic acid and E-caprolactam is used.

* * * * *